J. P. H. WOHLENBERG.
Millstone Dress.
No. 108,422. Patented Oct. 18, 1870.
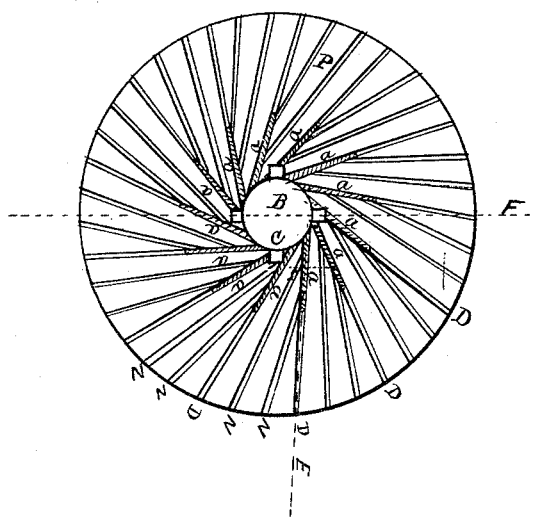
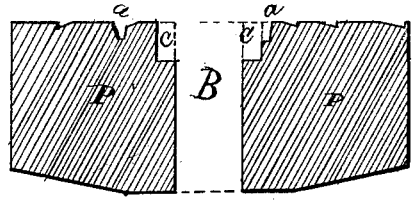
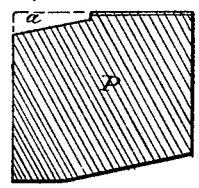
INVENTOR.
John P. H. Wohlenberg
W. W. Sanborn
D. T. Ellis
Witnesses

United States Patent Office.

JOHN P. H. WOHLENBERG, OF LYONS, IOWA.

Letters Patent No. 108,422, dated October 18, 1870.

IMPROVEMENT IN MILLSTONE-DRESS.

The Schedule referred to in these Letters Patent and making part of the same

---

I, JOHN P. H. WOHLENBERG, of Lyons, county of Clinton, State of Iowa, have invented certain Improvements in Millstones, of which the following is a specification.

My invention relates to the formation of an air-space or draught-chamber in each leading furrow of the upper or running-stone of a flouring-mill, by cutting a recess in the bottom thereof, from the eye of the stone outwardly to a point about midway the length of the leading furrow, (so as to reach beyond the departure therefrom of the outer branch furrow,) and of a depth at the outer end twice that of the leading furrow, and which increases gradually thence until it opens into the eye the object of said invention being to facilitate the ventilation of the stone by the introduction and distribution of air from the eye over the grinding surfaces of the stone.

Description of the Accompanying Drawing.

Figure 1 is a plan of the top millstone, showing the location of furrows.

Figure 2 is a section on line F, fig. 1.

Figure 3 is a section on line E, fig. 1, lengthwise of air-furrow.

Figure 4 is a cross-section of furrow on line J, fig. 1.

Same letters refer to same parts in all the figures.

General Description.

*a a a a*, &c., represent the location of the air-chambers.

B, the eye of the stone.

C, the sockets to receive the bail.

D D D, &c., represent the main grinding-furrows leading from the eye of the stone.

N N N, &c., branch grinding-furrows, leading from the leading furrows.

P, top millstone.

Construction and Operation.

I cut the air-chambers or recesses *a a a*, &c., into the stone about two and a half inches deep at the eye, and two inches wide, and taper them to one-half inch deep by three-fourths inch wide at the end of said furrow, the end passing a little beyond the line of the branch grinding-furrow, as shown in fig. 1. These air-chambers are cut longitudinally in the bottom of the main furrows.

*a*, fig. 3, shows a longitudinal section of the air-chamber or recess, and

*a*, fig. 4, shows a cross-section of said recess at J, fig. 1.

After cutting these air-recesses I hang the stone in the usual way, having the grinding-furrows in both the upper and under stone, in any form or shape, only they must all run to the air-furrows.

In grinding, the motion of the running-stone sends the air in large quantities through the recesses *a a a*, &c., and the grinding-furrows opening thereinto receive the air at the point of grinding, so that it mingles with the grain during the whole process of grinding, thereby preventing undue heat, and, consequently, injury to the flour.

I do not claim any particular arrangement of grinding-furrows.

Claim.

I claim as my invention—

The millstone-dress herein described, consisting of the tangential furrows D D, branch-furrows N N, and air-chambers or recesses *a a*, all constructed and arranged as shown, and for the purpose set forth.

In witness whereof, I have hereunto set my hand and affixed my name, in the presence of two witnesses, on this 12th day of August, A. D. 1870.

JOHN P. H. WOHLENBERG.

Witnesses:
WM. W. SANBORN,
D. W. ELLIS.